Dec. 12, 1933.  J. J. NEUMAN  1,939,184
AUTOMATIC CONTROL MEANS FOR CONVEYER SYSTEMS
Original Filed Dec. 7, 1929   2 Sheets-Sheet 1

INVENTOR
Jacob J. Neuman
BY C. P. Goepel
his ATTORNEY

Dec. 12, 1933.  J. J. NEUMAN  1,939,184
AUTOMATIC CONTROL MEANS FOR CONVEYER SYSTEMS
Original Filed Dec. 7, 1929   2 Sheets-Sheet 2

INVENTOR
Jacob J. Neuman
BY C. P. Goepel
his ATTORNEY

Patented Dec. 12, 1933

1,939,184

UNITED STATES PATENT OFFICE 1,939,184

AUTOMATIC CONTROL MEANS FOR CONVEYER SYSTEMS

Jacob J. Neuman, Jamaica, N. Y.

Original application December 7, 1929, Serial No. 412,414. Divided and this application January 23, 1931. Serial No. 510,709

2 Claims. (Cl. 198—21)

This invention relates to automatic control means for conveyer systems and constitutes a division of the subject matter of my Patent 1,823,283, granted September 15, 1931.

It is the primary object and purpose of my present improvements to provide simple, efficient and reliable means for automatically controlling the operation of one or more power-driven tributary feed conveyers associated with a main line conveyer whereby interruption of the continuous operation of the latter conveyer or collision between articles carried thereon, and the articles fed thereto by the tributary conveyer, is avoided.

It is a further object of the invention to provide a normally open switch controlling the circuit of an electric motor operating the tributary conveyer to be directly engaged and actuated to closed position by an article deposited upon said conveyer, together with additional normally closed switch means in the circuit of said motor engaged and actuated by articles on the main conveyer to render said motor inoperative and prevent the delivery of the article deposited on the tributary conveyer to said main conveyer.

With the above and other objects in view, the invention consists in the improved automatic control means for conveyer systems and in the form, construction and relative arrangement of its several parts, as will be hereinafter more fully described, illustrated in the accompanying drawings, and subsequently incorporated in the subjoined claims.

In the drawings, wherein I have illustrated one simple and practical embodiment of my present improvements, and in which similar reference characters designate corresponding parts throughout the several views,—

Figure 1:
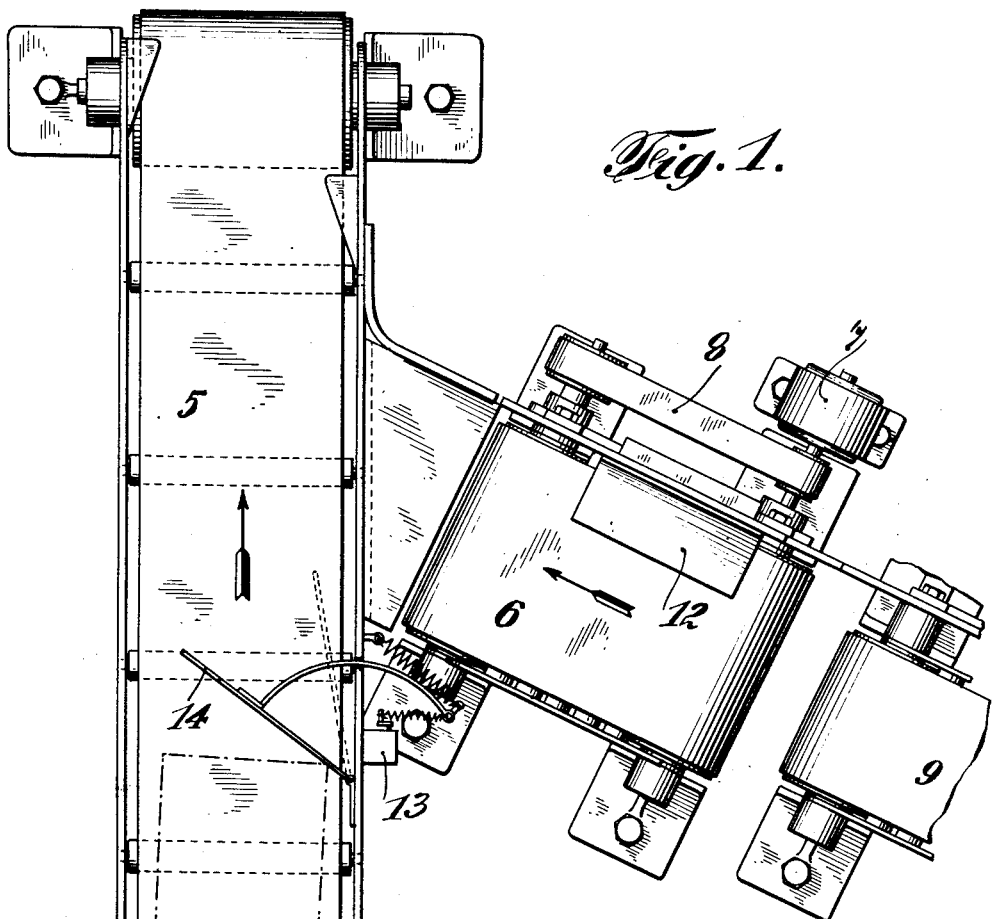
Figure 1 is a plan view of a power operated conveyer system provided with my present invention.
Figure 4:
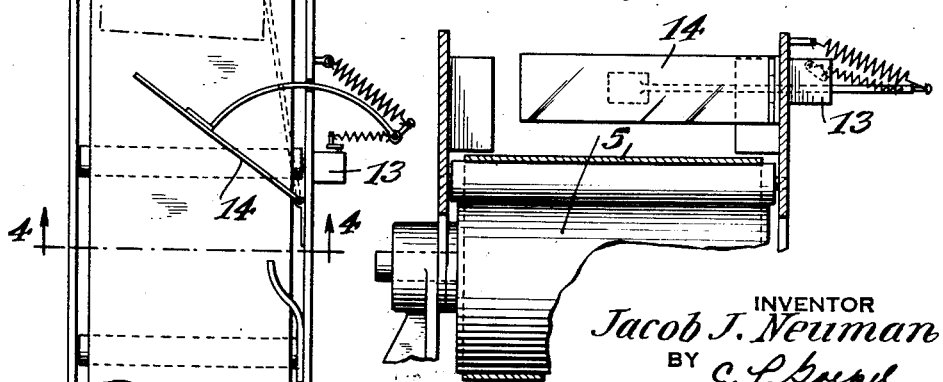
Fig. 4 is a transverse sectional view of the main line conveyer taken substantially on the line 4—4 of Fig. 1.
Figure 2:
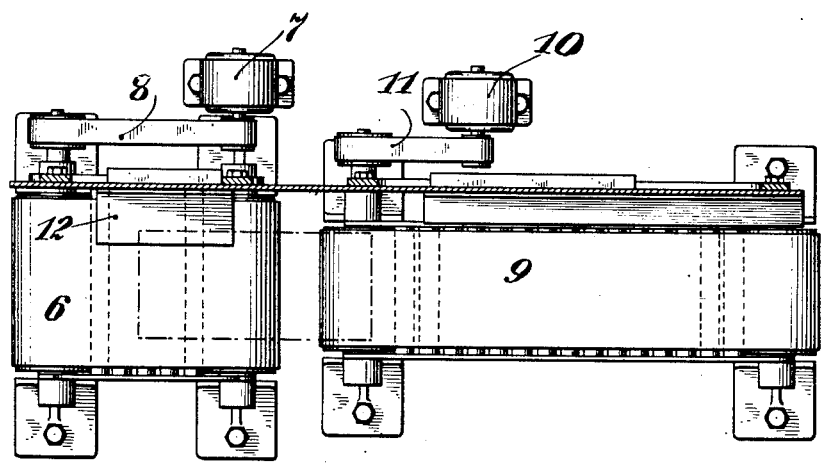
Fig. 2 is a plan view of the tributary feed conveyer and a delivery conveyer associated therewith to deliver the filled containers from a packaging machine to the tributary conveyer.

Referring in detail to the drawings, 5 designates the main power-driven conveyer which may be of any conventional type or construction, and of such length as to be common to any desired number of tributary feed conveyers. One of the tributary conveyers is shown at 6, and in the present instance is arranged obliquely with respect to the main line conveyer at one side thereof to discharge articles upon the main line conveyer in the direction of movement of the articles carried by the latter conveyer. The conveyer 6 is driven by an electric motor indicated at 7 through the drive belt 8 or any other suitable power transmitting means. In the present instance, I have shown a delivery conveyer 9 arranged in line with the tributary feed conveyer 6 which may be associated with a packaging machine, to receive the filled containers directly from said machine. This delivery conveyer is driven by a second electric motor 10 operatively connected with one of the end rollers of the conveyer by the drive belt 11.

Above the tributary conveyer 6, there is suitably mounted a normally open switch member 12 arranged in the circuit of the operating motor 7. The adjacent ends of the conveyers 6 and 9 are slightly spaced apart so that the filled containers in upright position on the conveyer 9 when discharged from the end thereof will be tilted upon the end of the conveyer 6 and fall downwardly by gravity upon the latter, and upon the switch member 12 so as to thereby move said switch member to closed position.

There is also arranged in the circuit of the motor 7, a plurality of normally closed switches 13 spaced apart longitudinally of the main conveyer 5, each of said switches including a movable spring held plate 14 normally extending obliquely and transversely across the upper stretch of the conveyer 5 and adapted for engagement by filled containers thereon.

Figure 3:
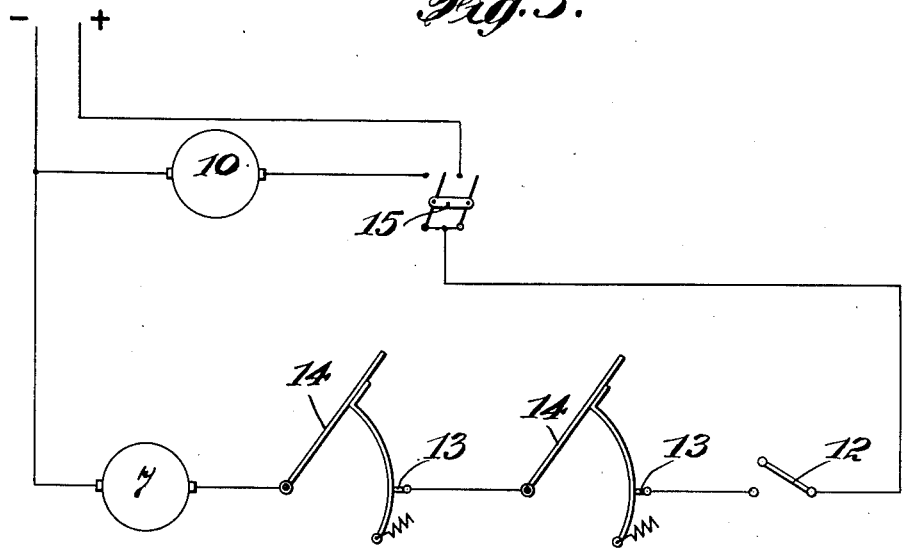
Fig. 3 is a diagrammatic view of the electrical current supply circuit for the conveyer operating motors.

The two motors 7 and 10 for the conveyers 6 and 9 are adapted to be connected in a common supply circuit by any convenient type of two pole switch as indicated at 15 in Fig. 3 of the drawings. As shown by the arrows in Fig. 1, the conveyer 6 delivers the article which has been deposited thereon in an oblique path upon the upper stretch of the conveyer 5 in the direction of its travel. The spaced switches 13 are located adjacent the point of juncture of these two conveyers. Thus, it will be apparent that an article on the conveyer 5 within a predetermined distance of the conveyer 6 will actuate one of the switches 13, moving the same to open position and thus preventing the operation of the conveyer 6, notwithstanding the fact that the circuit of its motor 7 has been closed by the deposit of an article on the switch member 12.

The spacing of the switches 13 is such with respect to the length of the articles carried by the conveyer 5 that before the first switch which is engaged and opened by an article is released for movement to its normal closed position, the second of these switches which is nearest to the conveyer 6 will be engaged by the article on conveyer 5 and moved to open position, thus maintaining an open circuit of the motor 7. After this second switch is released and returns to its closed position, and providing the first switch 13 has not been engaged and opened by another article on the conveyer 5, the circuit of motor 7 will then be closed, providing an article has been deposited on conveyer 6 and closed by the switch 12. Thus, the conveyer 6 will be operated to deliver the article thereon to the main conveyer 5. In this manner, it will be evident that collision between the articles delivered from the tributary conveyer 6 and those carried by the main conveyer 5, is impossible, thus avoiding interference with the operation of either conveyer or possible injury to the articles.

From the foregoing description considered in connection with the accompanying drawings, the construction, manner of operation and several advantages of my present invention will be clearly and fully understood. It will be seen that the apparatus employed is relatively simple in the construction of its several parts, not liable to get out of order and efficient and reliable in its functional operation. Of course, the mounting and arrangement of the several conveyers as illustrated in the drawings is merely suggestive, it being apparent that various other arrangements of these conveyers may be resorted to while still accomplishing the essential purpose of the present invention. Also various other types or forms of the circuit closing and opening switches as above referred to might be employed. Therefore, no unnecessary limitations are to be implied from the foregoing more or less detailed description, and the privilege is reserved of resorting to all such legitimate changes therein as may be fairly embodied within the spirit and scope of the invention as claimed.

I claim:

1. In combination, a main continuously operating, power driven conveyer, a tributary conveyer movable substantially in the plane of said main conveyer and in an angular direction relative thereto, an operating motor for the tributary conveyer and a circuit therefor, switch means in said circuit including a vertically movable member operated to circuit closing position by the fall of an article upon the tributary conveyer, and additional normally closed switch means in series with said first named means and operated to circuit opening position by an article on the main conveyer.

2. In automatic control means for conveyer systems, having a main continuously operating power-driven conveyer to convey packaged articles in one direction, a tributary conveyer to convey packaged articles to the main conveyer in a direction angularly to that of the main conveyer at the junction of said conveyers, an operating motor for the tributary conveyer, and a circuit therefor, the combination of switch means on the tributary conveyer operative by packaged articles thereon to close the tributary conveyer motor circuit and set the tributary conveyer in continuous movement, and move the packages towards the main conveyer, and switch means in the path of the articles on the main conveyer in proximity to the junction of the conveyers, to open the circuit of the tributary conveyer motor and render inoperative the tributary conveyer to stop its movement, whereby articles on the tributary conveyer are prevented from moving onto the main conveyer during the time said tributary conveyer motor circuit is open and articles on the tributary conveyer are moved onto the main conveyer when said circuit is again closed.

JACOB J. NEUMAN.